United States Patent

Yuasa et al.

[11] Patent Number: 5,951,437
[45] Date of Patent: Sep. 14, 1999

[54] APPARATUS FOR CONTROLLING UPSHIFTS OR DOWNSHIFTS AS A FUNCTION OF THROTTLE SPEEDS IN A CONTINUOUSLY VARIABLE TRANSMISSION AND METHOD THEREOF

[75] Inventors: Hiroyuki Yuasa; Masuo Kashiwabara, both of Atsugi, Japan

[73] Assignee: Unisia Jecs Corporation, Kanagawa-ken, Japan

[21] Appl. No.: 08/905,544

[22] Filed: Aug. 4, 1997

[30] Foreign Application Priority Data

Aug. 5, 1996 [JP] Japan .................................. 8-205928

[51] Int. Cl.$^6$ .............................. F16H 9/00; F16H 61/04
[52] U.S. Cl. ................................ 477/46; 477/45; 477/905
[58] Field of Search ................................ 477/45, 46, 48, 477/49, 904, 905

[56] References Cited

U.S. PATENT DOCUMENTS

| | | |
|---|---|---|
| 4,536,171 | 8/1985 | Tanaka et al. . |
| 4,589,302 | 5/1986 | Oda et al. ............................ 477/905 X |
| 4,603,602 | 8/1986 | Tanaka et al. . |
| 4,850,935 | 7/1989 | Morimoto ............................. 477/46 X |
| 4,867,732 | 9/1989 | Soga et al. ............................ 477/46 X |
| 5,514,051 | 5/1996 | Heid et al. ........................... 477/904 X |
| 5,607,373 | 3/1997 | Ochiai et al. ........................... 477/46 |
| 5,695,428 | 12/1997 | Yuasa et al. ......................... 477/46 X |
| 5,790,968 | 8/1998 | Kashiwabara et al. ............... 477/46 X |
| 5,803,862 | 9/1998 | Ochiai et al. ............................. 477/45 |

FOREIGN PATENT DOCUMENTS

| | | |
|---|---|---|
| 0 258 004 A1 | 3/1988 | European Pat. Off. . |
| 0 260 117 A1 | 3/1988 | European Pat. Off. . |
| 8-74958 | 3/1996 | Japan . |

*Primary Examiner*—Khoi Q. Ta
*Attorney, Agent, or Firm*—McDermott, Will & Emery

[57] ABSTRACT

The up-shift is discriminated to be in any one of a first up-shift mode in which the throttle opening degree remains nearly constant, a second up-shift mode accompanying the operation for nearly fully closing the throttle or a third up-shift mode accompanying the operation for closing the throttle to a half opened state. On the other hand, the down-shift is discriminated to be either in a first down-shift mode which accompanies the operation for opening the throttle or in a second down-shift mode accompanying the decrease in the vehicle speed. The rate of changing the speed is set for each of the speed change modes, and the speed change ratio of the continuously variable transmission is so controlled that the actual speed change ratio is gradually brought to the basic speed change ratio based upon said rate of changing the speed.

22 Claims, 7 Drawing Sheets

APPARATUS FOR CONTROLLING UPSHIFTS OR DOWNSHIFTS AS A FUNCTION OF THROTTLE SPEEDS IN A CONTINUOUSLY VARIABLE TRANSMISSION AND METHOD THEREOF

BACKGROUND OF THE INVENTION

1. Field of the Invention

The present invention relates to an apparatus for controlling a continuously variable transmission and to a method thereof. Particularly, the invention relates to technology for optimizing a rate of changing the speed of a continuously variable transmission.

2. Related Art of the Invention

A conventional method of controlling a rate of changing the speed of a continuously variable transmission has been disclosed in, for example, Japanese Unexamined Patent Publication No. 8-74958.

According to this method, the up-shift is divided into an up-shift in a state where the throttle opening degree remains nearly constant (hereinafter referred to as a first up-shift mode) and an up-shift accompanying a change in the throttle opening degree, and the up-shift control operation is carried out at different rates of changing the speed.

Even in the same up-shift operation accompanying a change in the throttle opening degree, however, it has been confirmed through experiment that a different rate of changing the speed is required depending upon the up-shift of when the throttle valve is fully closed (hereinafter referred to as a second up-shift mode) and the up-shift of when the throttle valve is closed nearly half (hereinafter referred to as a third up-shift mode).

That is, it is generally preferable that the rate of changing the speed is larger during the third up-shift mode than during the second up-shift mode. When the rate of changing the speed of during the third up-shift mode is set to a relatively small rate that meets the second up-shift mode, the rotational speed of the engine does not decrease as desired despite the throttle valve is closed and the driver feels it offensive. Conversely, when the rate of changing the speed of during the third up-shift mode is set to be relatively large that meets the first up-shift mode, the rotational speed of the engine decreases to an excess degree causing the driver to feel it offensive.

According to the prior art, however, the speed is changed at the same rate when the up-shift operation is effected accompanying a change in the throttle opening degree; i.e., the speed is not changed at a rate to meet the second up-shift mode or the third up-shift mode, and the driver feels it offensive when the speed is changed.

According to the prior art, furthermore, the speed is changed at the same rate during the down-shift operation; i.e., the transmission has not been so constructed as to discriminate the kind of down-shift operation to change the speed at a different rate. Even in the same down-shift operation, it has been confirmed through experiment that it is desired to change the speed at a different rate depending upon the down-shift to meet the demand for acceleration by opening the throttle valve (hereinafter referred to as first down-shift mode) and the down-shift that is effected when the vehicle speed has dropped (hereinafter referred to as second down-shift mode). According to the prior art, it is likely that the driver feels it offensive at the time of down-shift operation.

SUMMARY OF THE INVENTION

The present invention was accomplished in view of the above-mentioned problems, and its object is to control the speed-change operation based on a suitable rate of changing the speed by discriminating the up-shift and down-shift in a more sophisticated manner depending upon a difference in the request for a rate of changing the speed.

In order to accomplish the above-mentioned object according to the apparatus and method of controlling a continuously variable transmission of the present invention, the up-shift is discriminated to be any one of a first up-shift mode of when the throttle opening degree remains nearly constant, a second up-shift mode accompanying the operation for closing the throttle valve to its nearly fully closed state, or a third up-shift mode accompanying the operation for half closing the throttle valve, and the speed is changed at a different rate depending upon these up-shift modes.

According to this constitution, the speed is changed at a proper rate for each of the three up-shift modes that require different rates of changing the speed, and the driver no longer feels it offensive to change the speed.

Here, it is desired that the largest rate of changing the speed is set during the first up-shift mode and the smallest rate of changing the speed is set during the second up-shift mode.

That is, the rates of changing the speed are set maintaining a relationship of first up-shift mode>third up-shift mode>second up-shift mode. In the first up-shift mode which is the accelerating state with the throttle valve maintained constant, the basic speed change ratio gradually changes. Therefore, a relatively large rate of changing the speed is required maintaining convergence to the basic speed change ratio and avoiding rev-up feeling. In the second up-shift mode, on the other hand, the throttle valve is fully closed and the down-shift is required as a result of a decrease in the vehicle speed. Therefore, the change of speed needs not quickly respond to the request for up-shift accompanying the closure of the throttle valve. A too large rate of changing the speed creates a rush-out feeling. In the third up-shift mode, in general, it is presumed that the accelerating state is shifted to the steady-state running, and the basic speed change ratio stepwisely changes depending upon the throttle operation. When a relatively large rate of changing the speed equivalent to that of the first up-shift mode is given, therefore, the rotational speed drops down quickly causing the driver to feel it offensive. When a relatively small rate of changing the speed that meets the second up-shift mode is given, on the other hand, the rotational speed does not drop as desired despite the throttle valve is closed, and the driver feels it offensive. It is therefore preferable to give a rate of changing the speed which lies between that of the first up-shift mode and that of the second up-shift mode.

Furthermore, when the constitution is such that the basic speed change ratio is set based upon the throttle opening degree, it can be so constituted as to discriminate to which up-shift modes the up-shift operation corresponds based upon the throttle opening degree and the amount of change within a predetermined period of time of either the throttle opening degree or the basic speed change ratio.

That is, since the basic speed change ratio is set depending upon the throttle opening degree, the operation for stepwisely closing the throttle valve to shift the acceleration to the steady-state running or the operation for stepwisely closing the throttle valve to decelerate, results in a stepwise change in the basic speed change ratio. Therefore, the throttle operation state that corresponds to the second up-shift mode or the third up-shift mode can be discriminated from the throttle opening degree or from the amount of change in the basic speed change ratio, and the second or the third up-shift mode can be discriminated from the throttle opening degree at that moment.

Here, it is preferable that the amount of change for discriminating the second up-shift mode is different from the amount of change for discriminating the third up-shift mode.

That is, the rate of the throttle operation is usually different depending upon when the throttle is fully closed in order to decelerate and when the throttle is half closed in order to shift the acceleration to the steady-state running. Therefore, based upon a difference in the rate of the operation, the second up-shift mode and the third up-shift mode are discriminated from each other.

When the constitution is such that a target speed change ratio is set to follow the basic speed change ratio at a predetermined rate of changing the speed and the speed change ratio of the continuously variable transmission is controlled according to the above target speed change ratio, the basic speed change ratio is compared with the target speed change ratio to discriminate whether the change of speed is either the up-shift or the down-shift.

When the basic speed change ratio stepwisely changes toward the up-shift direction, the target speed change ratio gradually changes toward the up-shift direction to approach the basic speed change ratio. Therefore, the up-shift or the down-shift is determined based upon which is larger between the target speed change ratio and the basic speed change ratio.

Here, the rate of progress in the change of speed should be operated based upon the basic speed change ratio and the target speed change ratio, and the rate of changing the speed should be returned back to a reference rate when the above rate of progress has reached a predetermined value or above.

When the above rate of progress reaches the predetermined value or above and it is determined that the target speed change ratio (actual speed change ratio) has sufficiently approached the change in the basic speed change ratio, i.e., when it is determined that the change of speed is nearly finished, the rate of changing the speed depending upon the up-shift mode until then is returned back to the reference rate. In the present invention, the speed change ratio=output rotational speed/input rotational speed.

According to the apparatus and method for controlling the continuously variable transmission of the present invention, the down-shift is discriminated to be either in a first down-shift mode as a result of opening the throttle valve or in a second down-shift mode as a result of a decrease in the vehicle speed, and a different rate of changing the speed is set for each of these down-shift modes.

According to this constitution, the speed can be changed at a proper rate for each of the above-mentioned two kinds of down-shift modes that require different rates of changing the speed, and the driver does not feel it offensive.

Here, it is preferable that the rate of changing the speed during the second down-shift mode is larger than the rate of changing the speed of during the first down-shift mode.

According to this constitution, the rate of changing the speed during the down-shift operation is larger when the vehicle speed is low than when it is requested to accelerate. This makes it possible to avoid a quick increase in the rotational speed at the time of acceleration and to maintain convergence of speed change ratio during the deceleration.

When the constitution is such that the basic speed change ratio is set based upon the throttle opening degree, furthermore, the down-shift is discriminated to be either in the first down-shift mode or in the second down-shift mode based upon the comparison of a predetermined value with the amount of change within a predetermined period of time of either the throttle opening degree or the basic speed change ratio.

Since the basic speed change ratio is set depending upon the throttle opening degree, it is made possible to discriminate the down-shift that is accompanied by a stepwise change in the basic speed change ratio corresponding to the opening operation of the throttle valve, based upon the amount of change within a predetermined period of time of either the throttle opening degree or the basic speed change ratio.

When the constitution is such that a target speed change ratio is set to follow the basic speed change ratio at a predetermined rate of changing the speed and when the speed change ratio of the continuously variable transmission is controlled depending upon the target speed change ratio, the basic speed change ratio is compared with the target speed change ratio to determine whether the change of speed is the up-shift or the down-shift.

When the basic speed change ratio stepwisely changes toward the down-shift direction, the target speed change ratio gradually changes toward the down-shift direction to approach the basic speed change ratio. Therefore, the up-shift or the down-shift is determined based upon which is larger between the target speed change ratio and the basic speed change ratio.

Here, the rate of progress in the change of speed should be operated based upon the basic speed change ratio and the target speed change ratio, and the rate of changing the speed should be returned back to a reference rate when the above rate of progress has reached a predetermined value or above.

When the above rate of progress reaches the predetermined value or above and it is determined that the target speed change ratio (actual speed change ratio) has sufficiently approached the change in the basic speed change ratio, i.e., when it is determined that the change of speed is nearly finished, the rate of changing the speed based on the down-shift mode is returned back to the reference rate.

Other objects and features of the present invention will become obvious from the following description of the embodiments in connection with the accompanying drawings.

PREFERRED EMBODIMENTS

Embodiments of the invention will now be described.

Figure 1:
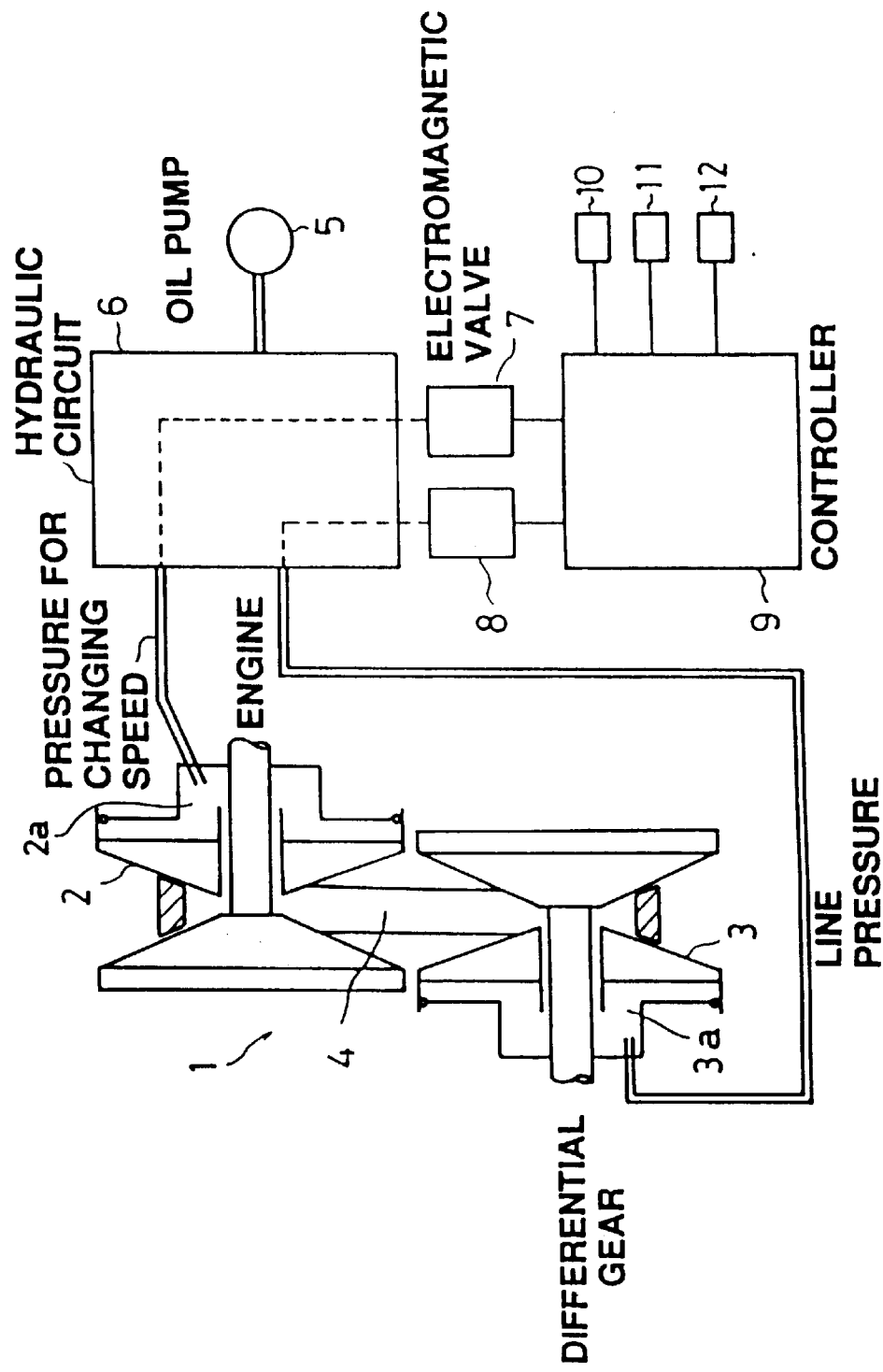
FIG. 1 is a diagram schematically illustrating a system of a continuously variable transmission according to an embodiment of the present invention.

FIG. 1 is a diagram illustrating the constitution of a system of a continuously variable transmission, wherein the continuously variable transmission 1 for vehicles that is combined with an engine that is not shown, comprises a primary pulley 2 of the engine side, a secondary pulley 3 of the drive shaft (differential gear) side and a belt 4 connected between them, wherein the pulley ratio is changed to continuously change the speed change ratio by changing the pressure for changing the speed of an actuator 2a on the side of the primary pulley and adjusting the line pressure applied to an actuator 3a on the side of the secondary pulley. Here, the continuously variable transmission may be of any other mechanism such as of the toroidal type, etc.

The speed change pressure and the line pressure are adjusted by being controlled by electromagnetic valves 7 and 8 having a function for relieving the hydraulic pressure of a hydraulic circuit 6 connected to an oil pump 5. The electromagnetic valves 7 and 8 are controlled by a controller 9.

Therefore, the electromagnetic valves 7 and 8 are controlled by the controller 9 thereby to control the speed change pressure and the line pressure, in order to continuously control the speed change ratio.

In order to control the speed change ratio, the controller 9 receives detection signals from a vehicle speed sensor 10 for detecting the vehicle speed VSP, from a throttle sensor 11 (throttle opening degree detector means) for detecting the opening degree TVO of a throttle valve interlocked to an accelerator pedal, and from an engine rotation sensor 12 for detecting the rotational speed Ne of the engine.

The controller 9 containing a microcomputer sets a basic speed change ratio that corresponds to the steady state based upon these signals, sets a target speed change ratio which follows the basic speed change ratio at a predetermined rate of changing the speed, and controls the change of speed by feedback controlling the electromagnetic valves 7 and 8 so that the actual speed change ratio is brought into agreement with the target speed change ratio.

Concretely speaking, the basic speed change ratio requested under the operation conditions is set based upon the vehicle speed VSP and the throttle opening degree TVO. When there is a deviation between the basic speed change ratio and the target speed change ratio, the target speed change ratio is stepwisely changed by each predetermined amount so as to be gradually brought to the basic speed change ratio. The electromagnetic valves 7 and 8 are feedback controlled so that the actual speed change ratio of the transmission obtained from the rotational speed Ne of the engine and the vehicle speed VSP (rotational speed of the output shaft of the transmission) is brought close to the target speed change ratio.

Therefore, the rate of changing the speed is determined by a unit amount by which the target speed change ratio is stepwisely changed toward the basic speed change ratio.

Controlling the change of speed will now be described with reference to flow charts of FIGS. 2 and 3.

At step 1 (denoted by S1 in the drawings, the same holds hereinafter), a basic speed change ratio BASE corresponding to the present vehicle speed VSP and to the throttle opening degree TVO is obtained by making reference to a map storing basic speed change ratios $i_{base}$ for each of the lattices sectionalized in advance depending upon the vehicle speed VSP and the throttle opening degree TVO (means for setting a basic speed change ratio).

At step 2, a rate of progress in the change of speed is operated from the present target speed change ratio $i_{tgt}$ and the basic speed change ratio $i_{base}$ set at step 1 in a manner as described below (means for operating the rate of progress).

Rate of progress=1−(|basic speed change ratio−target speed change ratio|)/basic speed change ratio.

Here, the speed change ratio=output rotational speed/input rotational speed.

At step 3, it is determined whether the steady state is being assumed or the change of speed is to be just finished based upon whether the rate of progress is equal to or larger than a predetermined value or not. When the rate of progress is equal to or larger than a predetermined value, the routine proceeds to step 4 where the steady state is determined, and the routine proceeds to step 14.

During the transient period in which the rate of progress is smaller than the predetermined value, the routine proceeds to step 5 where it is discriminated whether the change of speed is the up-shift or the down-shift based upon the comparison of the target speed change ratio $i_{tgt}$ with the basic speed change ratio $i_{base}$. Here, the change of speed is the down-shift when the basic speed change ratio $i_{base}$ is smaller than the target speed change ratio $i_{tgt}$ and, conversely, the change of speed is the up-shift when the basic speed change ratio $i_{base}$ is larger than the target speed change ratio $i_{tgt}$.

When it is discriminated at step 5 that the change of speed is the up-shift, the routine proceeds to step 6 where it is discriminated whether the amount of change ΔTVO of the throttle opening degree TVO within a predetermined period of time is smaller than a predetermined value (1) and whether the throttle opening degree TVO is smaller than a predetermined value (2).

The amount of change ΔTVO is operated as the latest opening degree TVO—opening degree TVO of a predetermined period of time before, and is operated as a negative value when the throttle valve is closed. The predetermined value (1) is given having a negative sign.

Therefore, whether or not the throttle opening degree TVO is stepwisely changed toward the closing direction by more than a predetermined opening degree is discriminated by discriminating whether the amount of change ΔTVO is smaller than a predetermined value (1) or not.

The predetermined value (2) has been set to be a very small opening degree near the fully closed state. When the amount of change ΔTVO is smaller than the predetermined value (1) and the throttle opening degree TVO is smaller than the predetermined value (2), then, the change of speed is discriminated to be the up-shift that accompanies the driver's operation for returning the throttle valve to nearly the closed state. In this case, the routine proceeds to a step 7 where the present up-shift is discriminated to be the second up-shift mode.

When it is discriminated at step 6 that the amount of change ΔTVO is equal to or larger than the predetermined value (1) and/or the throttle opening degree TVO is equal to or larger than the predetermined value (2), the routine proceeds to step 8.

At step 8, it is discriminated whether the amount of change ΔTVO is smaller than a predetermined value (3) and the throttle opening degree TVO is greater than a predetermined value (4) or not.

The predetermined value (3) is set as a negative value (close to 0) larger than the predetermined value (1), so that the state where the acceleration with the throttle valve being closed by a relatively small amount is shifted to the steady state, can be discriminated maintaining good precision in contrast with the state of the deceleration operation where the throttle valve is nearly fully closed.

The predetermined value (4) has been set to be larger than the predetermined value (3) to make it possible to discriminate the intention of the driver who wishes to shift the acceleration to the steady-state running without fully closing the throttle valve.

When it is discriminated at step 8 that the amount of change ΔTVO is smaller than the predetermined value (3) and the throttle opening degree TVO is larger than the predetermined value (4), it is so determined that the driver has closed the throttle half in an attempt to shift the acceleration to the steady-state running. In this case, the routine proceeds to step 9 where the present up-shift is discriminated to be in the third up-shift mode.

When it is discriminated at step 8 that the amount of change ΔTVO is equal to or larger than the predetermined value (3) and/or the throttle opening degree TVO is equal to or smaller than the predetermined value (4), i.e., when the up-shift is neither in the second up-shift mode nor in the third up-shift mode, it is so determined that the up-shift is due to an increase in the vehicle speed VSP in a state where the throttle opening degree is maintained nearly constant. Then, the routine proceeds to a step 10 where the up-shift is discriminated to be in the first up-shift mode.

The above-mentioned steps 5 to 10 correspond to an up-shift discrimination means.

When it is discriminated at step 5 that the change of speed is the down-shift based upon the comparison of the target speed change ratio $i_{tgt}$ with the basic speed change ratio $i_{base}$, the routine proceeds to step 11.

At step 11, the amount of change ΔTVO is compared with a predetermined positive value (5).

When the amount of change ΔTVO is in excess of the predetermined value (5), it is determined that the change of speed is the down-shift that accompanies the driver's operation for opening the throttle valve, and the routine proceeds to step 12 where the down-shift is discriminated to be in the first down-shift mode.

When it is discriminated at step 11 that the amount of change ΔTVO is equal to or smaller than the predetermined value (5), it is determined that the change of speed is the down-shift accompanying a drop in the vehicle speed VSP, and the routine proceeds to a step 13 where the down-shift is discriminated to be in the second down-shift mode. The above-mentioned steps 5 and 11 to 13 correspond to a down-shift discrimination means.

When the shifting state is discriminated as described above, step 14 sets a target inertial torque at the time of shifting that is used for operating the rate of changing the speed.

It is preferable that the target inertial torque increases with an increase in, for example, the engine torque. In this embodiment, furthermore, the target inertial torque is set to a different value depending upon the result of discriminating the shifting condition even when the engine torque remains the same.

Concretely speaking, at the time of up-shift, the target inertial torque is set maintaining a relationship of first up-shift mode>third up-shift mode>second up-shift mode, so that the greatest target inertial torque is set during the first up-shift mode and that the up-shift is effected at the greatest rate of changing the speed (means for changing the rate of changing the speed).

In the first up-shift mode where the basic speed change ratio gradually changes, a relatively large rate of changing the speed is given as described above to maintain convergence to the basic speed change ratio so as not to create rev-up feeling. In the second up-shift mode, a request for down-shift is produced due to a drop in the vehicle speed after the throttle valve is fully closed. Therefore, a relatively small rate of changing the speed is given so as not to create rush-out feeling.

Figure 4:
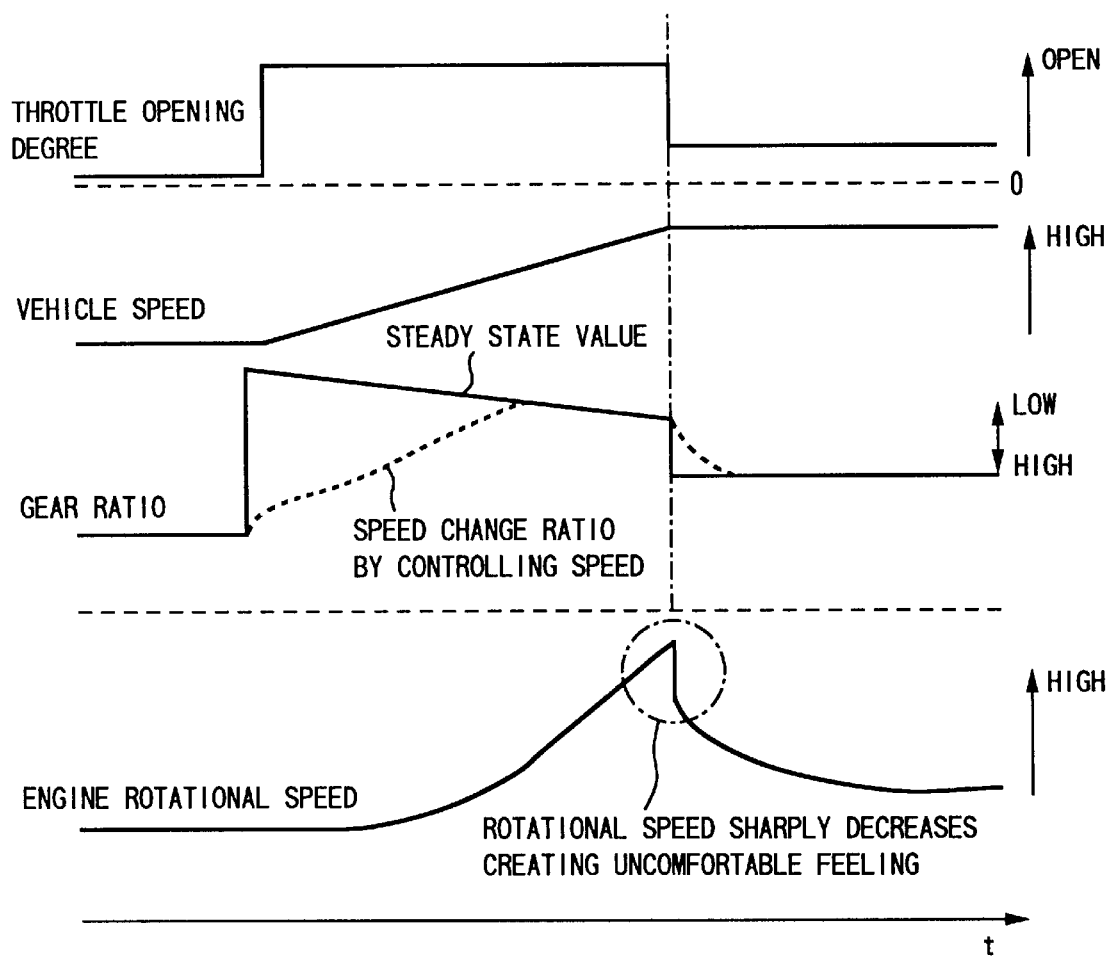
FIG. 4 is a time chart illustrating the characteristics of when the rate of changing the speed is too large during the third up-shift mode.
Figure 5:
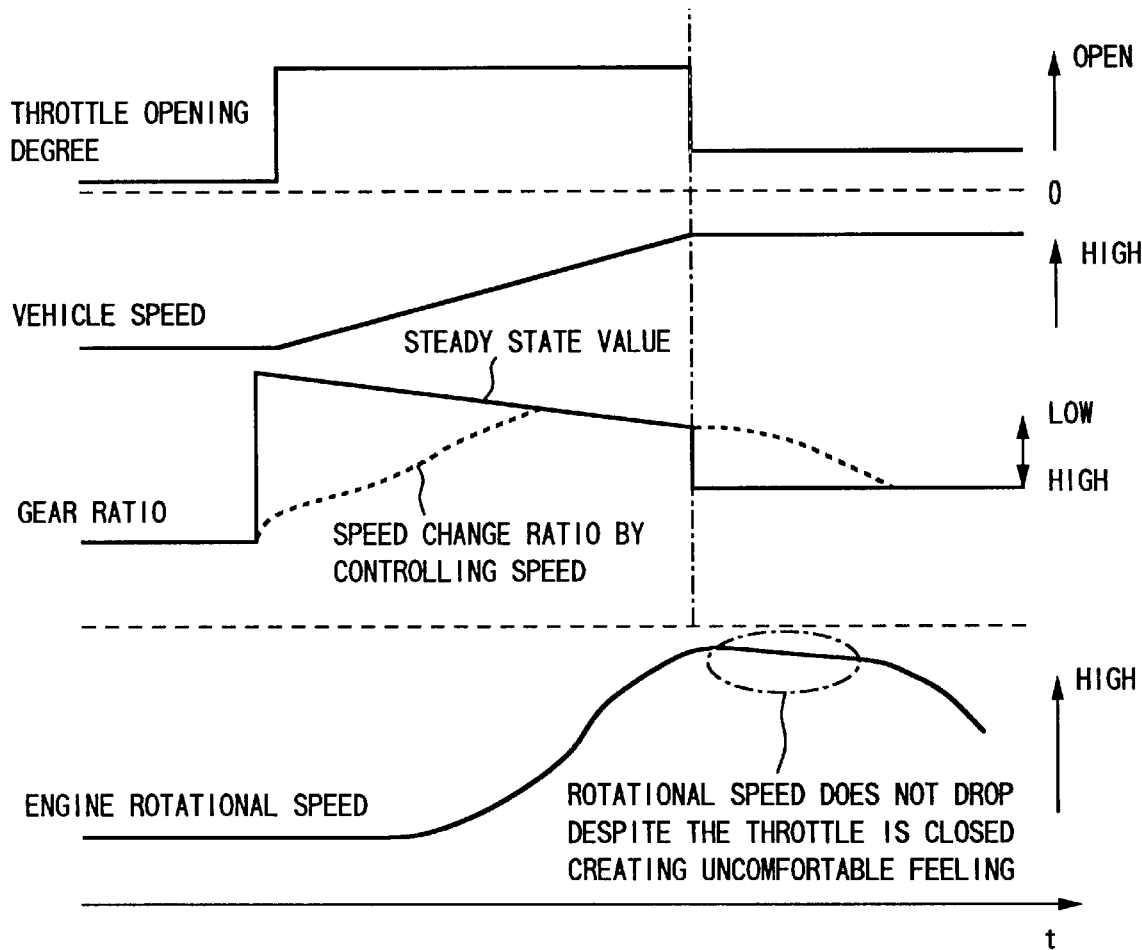
FIG. 5 is a time chart illustrating the characteristics of when the rate of changing the speed is too small during the third up-shift mode.

In the third up-shift mode, furthermore, the basic speed change ratio changes stepwise. When a rate of changing the speed which is as relatively large as that of the first up-shift mode is given, therefore, the rotational speed sharply decreases to create offensive feeling (see FIG. 4). Conversely, when a relatively small rate of changing the speed is given that meets the second up-shift mode, the rotational speed does not decrease despite the throttle valve is closed causing the driver to feel it offensive (see FIG. 5). It is therefore preferred to give a rate of changing the speed between that of the first up-shift mode and that of the second up-shift mode.

At the time of down-shift, furthermore, the target inertial torque is so set as to establish such a relationship of second down-shift mode>first down-shift mode; i.e., the target inertial torque is set to be larger during the second down-shift mode than during the first down-shift mode, so that the down-shift is executed at a larger rate of changing the speed (means for changing the rate of changing the speed).

This makes it possible to avoid a sharp increase in the rotational speed at the time of acceleration and to maintain the convergence of speed change ratio at the time of deceleration.

Here, it is preferable that the target inertial torque (rate of changing the speed) during the first up-shift mode is nearly equal to the target inertial torque (rate of changing the speed) during the second down-shift mode.

After the target inertial torque (rate of changing the speed) is set depending upon the first to third up-shift modes and the first and second down-shift modes, when the rate of progress in the change of speed becomes equal to or larger than a predetermined value and the traveling state is determined to be steady at step 4, it is preferable that the target inertial torque is set to be nearly equal to that of the second up-shift mode or smaller than that of the second up-shift mode, so that the rate of changing the speed is set to a relatively small reference rate (means for returning the rate of changing the speed), in order to avoid hunting in the target speed change ratio (actual speed change ratio) near the basic speed change ratio.

The engine torque can be estimated based on the throttle valve opening degree TVO and the rotational speed Ne of the engine. The method of setting the target inertial torque is in no way limited to the above-mentioned method only but may be the one based upon a deviation between an actual speed change ratio and the basic speed change ratio, the one based upon a deviation between the present vehicle drive force and a vehicle drive force of when the speed change ratio is controlled to acquire the basic speed change ratio, the one based upon a rate of changing the basic speed change ratio, or the one based upon a rate of change in the vehicle drive force. What is important here is that the target inertial torque set by any one of these methods holds the above-mentioned relationship that varies depending at least upon each kind of the shift.

When a target inertial torque is set, an amount of step change SV corresponding to the rate of changing the speed is set at step 15 based upon an actual speed change ratio i (=rotational speed of the output shaft/rotational speed of the engine) obtained from the rotational speed of the engine (input rotational speed) and the rotational speed of the output shaft of the transmission (output rotational speed), rotational speed No of the output shaft of the transmission, the above-mentioned target inertial torque TTINR, and inertial torque IE of the engine given as a constant, in compliance with the formula SV=TTINR/(i×IE×No).

According to the above formula, the amount of step change or, in other words, the rate of changing the speed increases with an increase in the target inertial torque.

According to the above formula, furthermore, the rate of changing the speed changes depending upon the vehicle speed (rotational speed No of the output shaft). In particular, the rate of changing the speed decreases toward the side of higher vehicle speed, making it possible to set the inertial torque constant at the time of changing the speed.

It is preferable that, even when, for example, the third up-shift mode is shifted to the first up-shift mode, the amount of step change for determining the rate of changing the speed is not changed at one time from a value that meets the third up-shift mode to a value that meets the first up-shift mode, but is gradually changed to a value that meets the first up-shift mode. Besides, the rate of changing the speed of the amount of step change may be different for each kind of the mode shifting.

After the amount of step change for determining the rate of changing the speed is calculated, the routine proceeds to step 16 where the target speed change ratio $i_{tgt}$ is changed by the amount of step change SV toward a direction to approach the basic speed change ratio $i_{base}$, and the target speed change ratio $i_{tgt}$ is updated (means for setting a target speed change ratio).

At step 17, the actual speed change ratio i is feedback controlled to come into agreement with the target speed change ratio $i_{tgt}$ (means for controlling the change of speed, means for controlling the speed change ratio).

Figure 2:
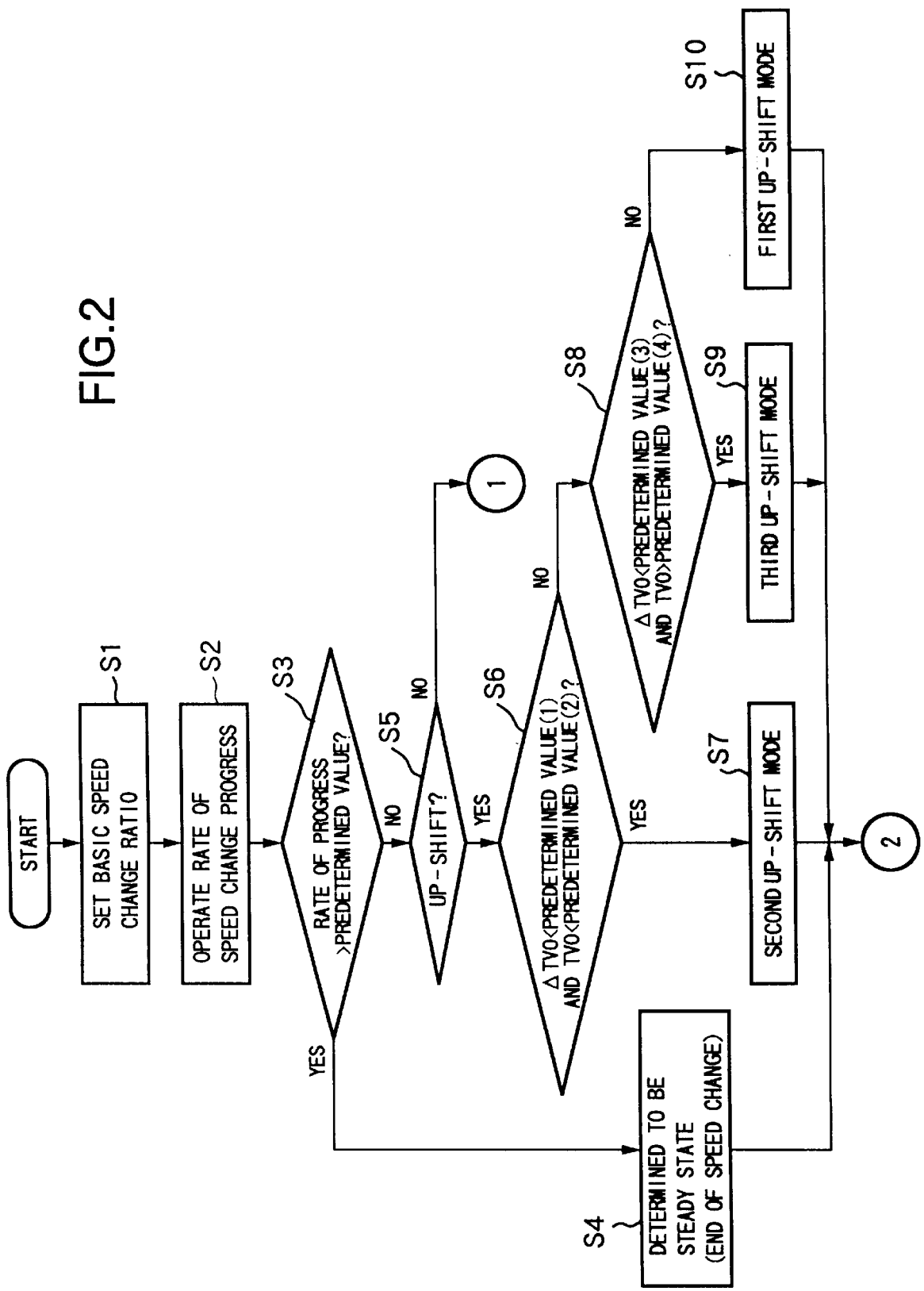
FIG. 2 is a flow chart illustrating how to control the change of speed according to the embodiment.
Figure 3:
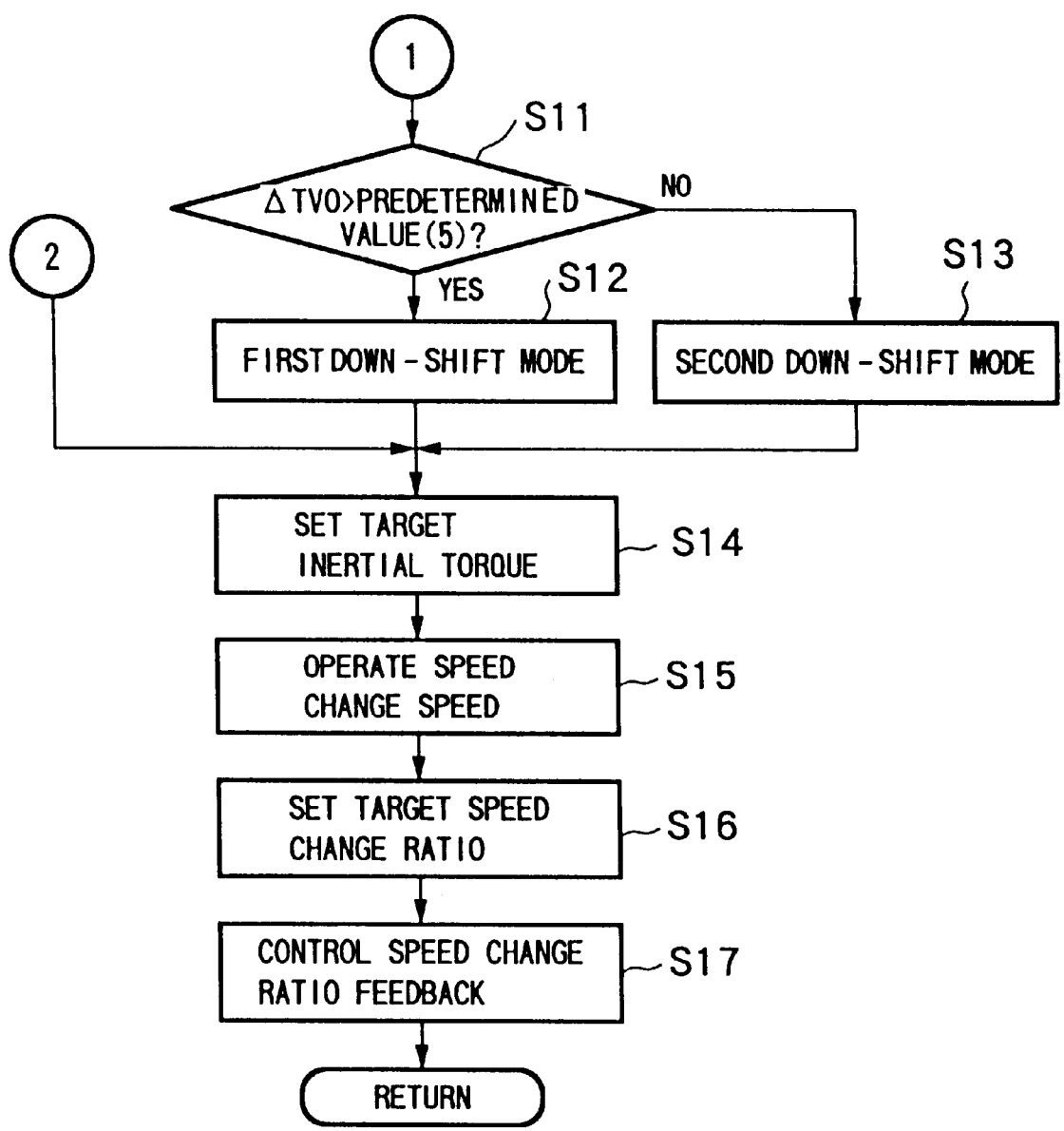
FIG. 3 is a flow chart illustrating how to control the change of speed according to the embodiment.

In the control operation illustrated by the flow chart of FIGS. 2 and 3, the kind of the shift is discriminated based upon the amount of change ΔTVO of the throttle opening degree TVO within a predetermined period of time. Here, however, the basic speed change ratio $i_{base}$ is set depending upon the throttle opening degree TVO and a change in the throttle opening degree TVO causes the basic speed change ratio $i_{base}$ to change. As shown in a flow chart of FIGS. 6 and 7, therefore, the kind of the shift may be discriminated based upon the amount of change $\Delta i_{base}$ (latest basic speed change ratio—basic speed change ratio of a predetermined period of time before) of the basic speed change ratio $i_{base}$ within a predetermined period of time instead of relying upon the amount of change TVO.

Figure 6:
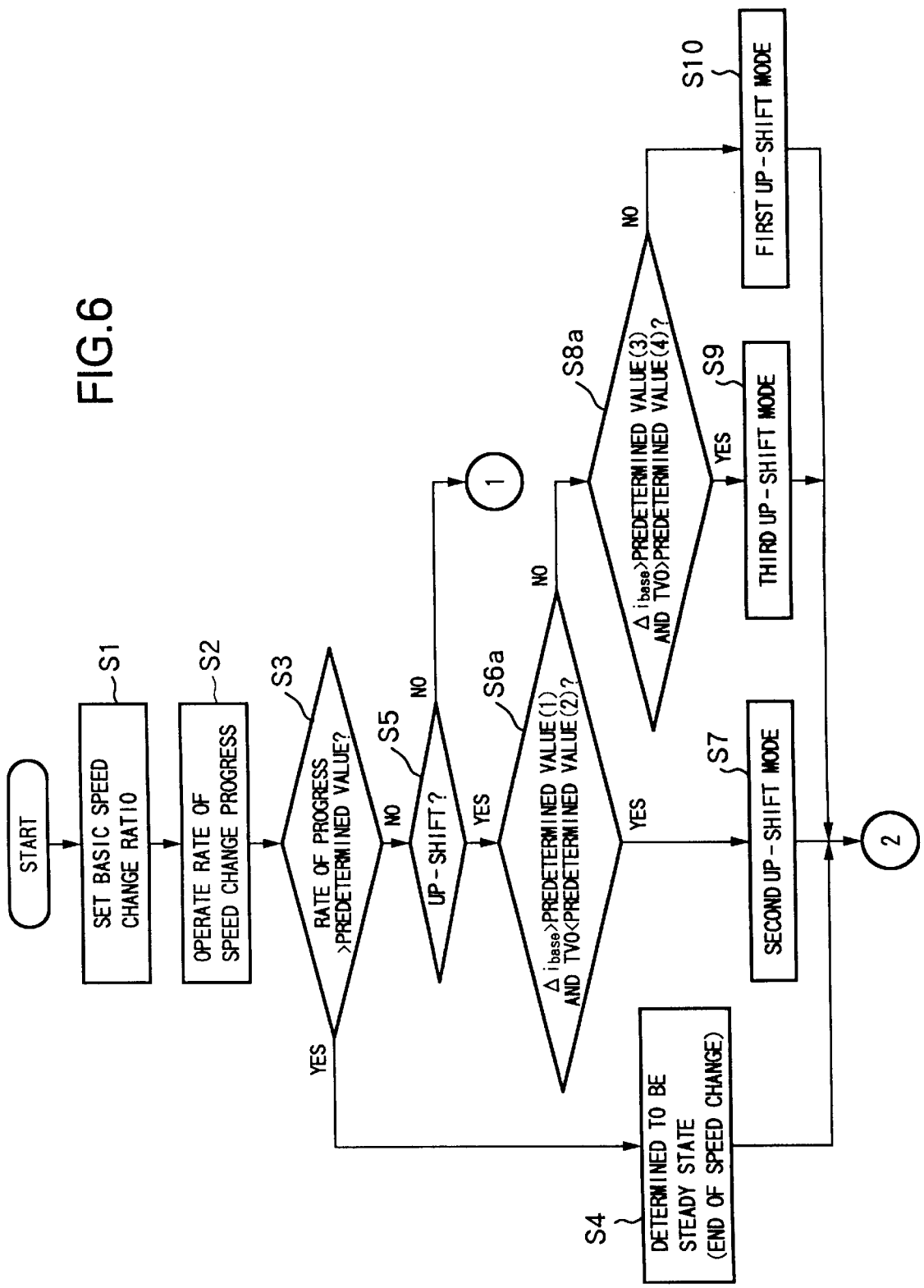
FIG. 6 is a flow chart illustrating how to control the change of speed according to another embodiment.
Figure 7:
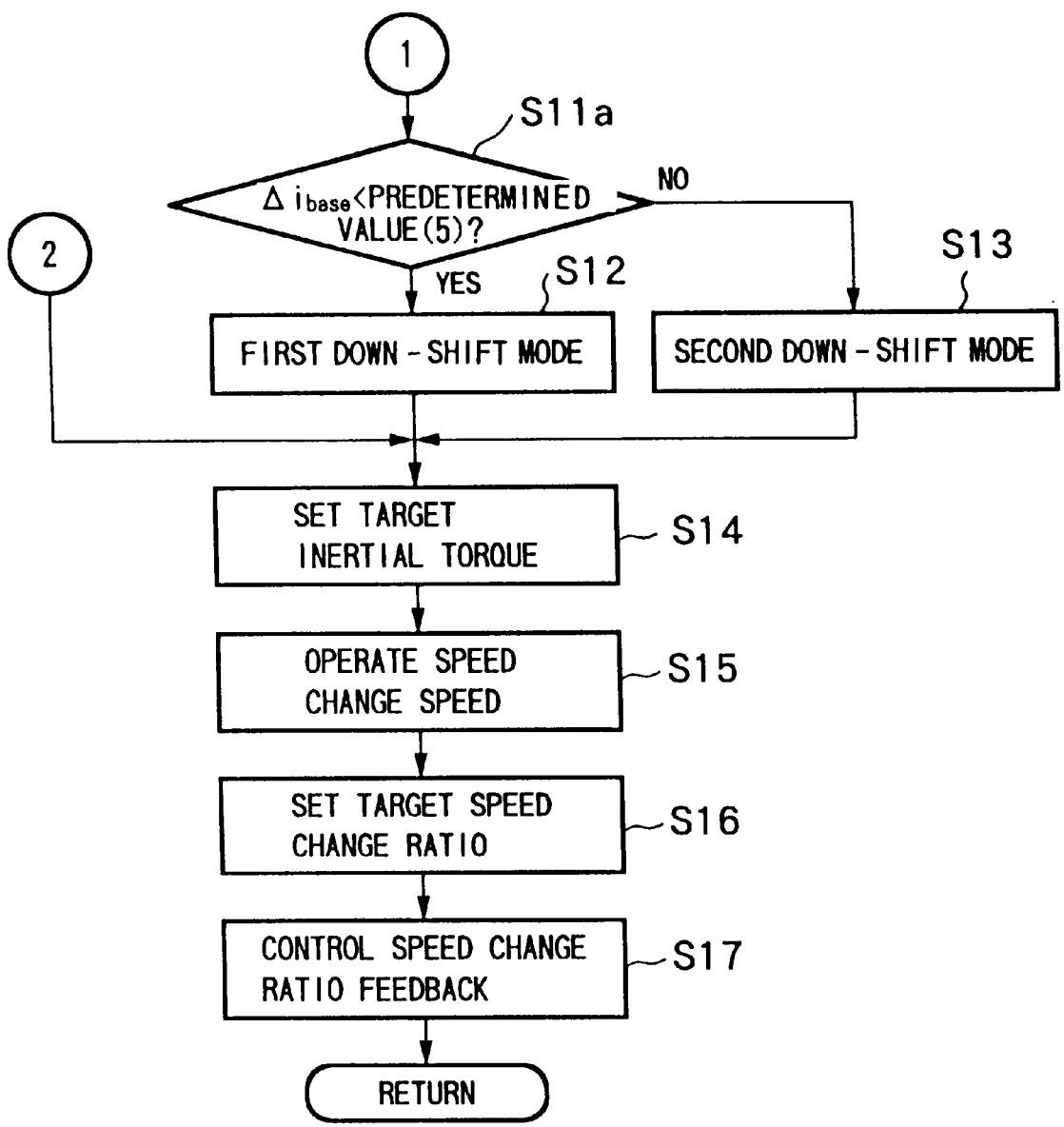
FIG. 7 is a flow chart illustrating how to control the change of speed according to another embodiment.

In the flow chart of FIGS. 6 and 7, steps other than the steps 6a, 8a and 11a execute quite the same processings as those of the flow chart of FIGS. 2 and 3, and are not described.

In this embodiment, a change in the basic speed change ratio toward the up-shift direction represents an increase in the basic speed change ratio (=output rotational speed/input rotational speed) and, hence, the kind of up-shift is discriminated by comparing the amount of change $\Delta i_{base}$ with a predetermined positive value. Conversely, a change in the basic speed change ratio in the down-shift direction represents a decrease in the basic speed change ratio and, hence, the kind of shift is discriminated by comparing the amount of change $\Delta i_{base}$ with a predetermined negative value.

At step 6a, it is discriminated whether the amount of change $\Delta i_{base}$ is equal to or larger than the predetermined positive value (1) or not to discriminate whether the basic speed change ratio is increasing to meet the driver's operation for fully closing the throttle. When the amount of change $\Delta i_{base}$ is equal to or larger than the predetermined positive value (1) and the throttle opening degree at that moment is in a nearly fully closed state which is smaller than the predetermined value (2), the up-shift is discriminated to be in the second up-shift mode.

At step 8a, furthermore, it is discriminated whether the amount of change $\Delta i_{base}$ is equal to or larger than the predetermined positive value (3) or not to discriminate whether the basic speed change ratio is increasing to meet the driver's operation for closing the throttle to a degree that is not in a fully closed state. When the amount of change $\Delta i_{base}$ is equal to or larger than the predetermined positive value (3) and the throttle opening degree at that moment is in excess of the predetermined value (4), the up-shift is discriminated to be in the third up-shift mode.

At step 11a, furthermore, the amount of change $\Delta i_{base}$ is compared with the predetermined negative value (5) to discriminate whether the change of speed is the down-shift operation accompanying the operation for opening the throttle or not. When the amount of change $\Delta i_{base}$ is smaller than the predetermined negative value (5), the down-shift is discriminated to be in the first down-shift mode. In other cases, the down-shift is determined to be in the second down-shift mode.

In the foregoing description, the target inertial torque was set for every mode of changing the speed. It is, however, also allowable to set a fixed rate of changing the speed for every mode of changing the speed and to directly set a rate of changing the speed relying upon the result of discriminating the mode for changing the speed.

It is further allowable to impart hysteresis characteristics in discriminating the amount of change ΔTVO, amount of change $\Delta i_{base}$ and throttle opening degree TVO.

What we claimed are:

1. An apparatus for controlling a continuously variable transmission comprising:

basic speed change ratio setting means for setting a basic speed change ratio depending upon predetermined transmission operation conditions including the position of a throttle of an internal combustion engine which is operatively connected with said continuously variable transmission:

change-of-speed control means for bringing a speed change ratio of the continuously variable transmission to said basic speed change ratio according to a predetermined rate of changing the speed;

up-shift discrimination means for discriminating an up-shift control operation in said change-of-speed control means to be any one of a first up-shift mode in which the throttle opening degree remains nearly constant, a second up-shift mode accompanying an operation which nearly fully closes the throttle and a third up-shift mode accompanying an operation which closes the throttle to a half opened state; and rate-of-changing-the-speed changing means for changing the rate of changing the speed in said change-of-speed control means for every up-shift mode discriminated by said up-shift discrimination means.

2. An apparatus for controlling a continuously variable transmission according to claim 1, wherein said rate-of-changing-the-speed changing means sets the largest rate of changing the speed during the first up-shift mode and sets the smallest rate of changing the speed during the second up-shift mode.

3. An apparatus for controlling a continuously variable transmission according to claim 1, further comprising:

throttle opening degree detector means for detecting the throttle opening degree; wherein said basic speed change ratio setting means sets said basic speed change ratio based on the operation conditions including, at least, said throttle opening degree, and said up-shift discrimination means discriminates to which up-shift modes the up-shift operation corresponds, based upon the throttle opening degree and the amount of change within a predetermined period of time of either the throttle opening degree or the basic speed change ratio.

4. An apparatus for controlling a continuously variable transmission according to claim 3, wherein said amount of change for discriminating said second up-shift mode is different from said amount of change for discriminating said third up-shift mode.

5. An apparatus for controlling a continuously variable transmission according to claim 1, wherein said change-of-speed control means includes:

target speed change ratio setting means for setting a target speed change ratio that follows said basic speed change ratio at a predetermined rate of changing the speed; and speed change ratio control means for controlling a speed change ratio of the continuously variable transmission according to said target speed change ratio;

wherein said up-shift discrimination means compares said basic speed change ratio with the target speed change ratio to discriminate whether the change of speed is either the up-shift or the down-shift, and to further discriminate whether the up-shift is in any one of the first up-shift mode, the second up-shift mode or the third up-shift mode.

6. An apparatus for controlling a continuously variable transmission according to claim 5, further comprising:

rate-of-progress-in-the-change-of-speed operation means for operating a rate of progress in the change of speed based upon said basic speed change ratio and said target speed change ratio: and rate-of-changing-the-speed return means for returning said rate of changing the speed into a reference rate when said rate of progress becomes equal to or greater than a predetermined value.

7. An apparatus for controlling a continuously variable transmission comprising:

basic speed change ratio setting means for setting a basic speed change ratio depending upon predetermined transmission operation conditions including the position of a throttle of an internal combustion engine operatively connected with said continuously variable transmission and for detecting vehicle speed;

change-of-speed control means for bringing a speed change ratio of the continuously variable transmission to said basic speed change ratio according to a predetermined rate of changing the speed;

down-shift discrimination means for discriminating the down-shift control operation in said change-of-speed control means to be either in one of a first down-shift mode accompanying an opening of the throttle or a second down-shift mode accompanying a decrease in vehicle speed; and rate-of-changing-the-speed changing means for changing the rate of changing the speed in said change-of-speed control means for every down-shift mode discriminated by said down-shift discrimination means.

8. An apparatus for controlling a continuously variable transmission according to claim 7, wherein said rate-of-changing-the-speed changing means sets the rate of changing the speed during the second down-shift mode to be larger than the rate of changing the speed during the first down-shift mode.

9. An apparatus for controlling a continuously variable transmission according to claim 7, further comprising:

throttle opening degree detector means for detecting the throttle opening degree; wherein said basic speed change ratio setting means sets said basic speed change ratio based on the operation conditions including, at least, said throttle opening degree, and said down-shift discrimination means discriminates to which down-shift modes, said first down-shift mode or said second down-shift mode the down-shift operation corresponds, based upon the comparison of a predetermined amount with an amount of change within a predetermined period of time of either the throttle opening degree or the basic speed change ratio.

10. An apparatus for controlling a continuously variable transmission according to claim 7, wherein said change-of-speed control means includes:

target speed change ratio setting means for setting a target speed change ratio that follows said basic speed change ratio at a predetermined rate of changing the speed; and speed change ratio control means for controlling a speed change ratio of the continuously variable transmission according to said target speed change ratio;

wherein said down-shift discrimination means compares said basic speed change ratio with the target speed change ratio to discriminate whether the change of speed is either the up-shift or the down-shift, and to further discriminate whether the down-shift is either in the first down-shift mode or in the second down-shift mode.

11. An apparatus for controlling a continuously variable transmission according to claim 10, further comprising:

rate-of-progress-in-the-change-of-speed operation means for operating a rate of progress in the change of speed based upon said basic speed change ratio and said target speed change ratio: and rate-of-changing-the-speed return means for returning said rate of changing the speed into a reference rate when said rate of progress becomes equal to or greater than a predetermined value.

12. A method of controlling a continuously variable transmission comprising the steps of:

setting a basic speed change ratio depending on selected transmission operation conditions including a position of an internal combustion engine throttle, and by bringing a speed change ratio of the continuously variable transmission toward said basic speed change ratio according to a predetermined rate of speed changing wherein an up-shift is discriminated to be one of a first up-shift mode in which a throttle opening degree remains nearly constant, a second up-shift mode accompanying an operation which nearly fully closes the throttle and a third up-shift mode accompanying an operation wherein the throttle is closed to a half opened state, the rate of speed changing is set for each of these up-shift modes, and a speed change ratio of the continuously variable transmission is brought to a basic speed change ratio that corresponds to the operation conditions according to the rate of changing the speed is set to different values for each of said up-shift modes.

13. A method of controlling a continuously variable transmission according to claim 12, wherein a largest rate of changing the speed is set during the first up-shift mode and a smallest rate of changing the speed is set during the second up-shift mode.

14. A method of controlling a continuously variable transmission according to claim 12, wherein the basic speed change ratio is set based on the operation conditions including, at least, the throttle opening degree, and it is discriminated to which up-shift modes the up-shift operation corresponds based upon the throttle opening degree and the amount of change within a predetermined period of time of either the throttle opening degree or the basic speed change ratio.

15. A method of controlling a continuously variable transmission according to claim 14, wherein said amount of change for discriminating said second up-shift mode is different from said amount of change for discriminating said third up-shift mode.

16. A method of controlling a continuously variable transmission according to claim 12, wherein a target speed change ratio is set to follow said basic speed change ratio at a predetermined rate of changing the speed, and a speed change ratio of the continuously variable transmission is controlled according to said target speed change ratio, and wherein said basic speed change ratio is compared with the target speed change ratio to discriminate whether the change of speed is either the up-shift or the down-shift, and it is discriminated whether the up-shift is in any one of the first up-shift mode, the second up-shift mode or the third up-shift mode.

17. A method of controlling a continuously variable transmission according to claim 16, wherein a rate of progress in the change of speed is operated based upon said basic speed change ratio and said target speed change ratio, and said rate of changing the speed is returned back to a reference rate when said rate of progress becomes equal to or greater than a predetermined value.

18. A method of controlling a continuously variable transmission by setting a basic speed change ratio depending on selected transmission operation conditions including a position of a throttle of an engine operatively connected with the continuously variable transmission, and a parameter indicative of vehicle speed, and by bringing a speed change ratio of the continuously variable transmission toward said basic speed change ratio according to a predetermined rate of changing the speed, wherein a down-shift is discriminated to be either a first down-shift mode accompanying an operation for opening a throttle or a second down-shift mode accompanying a decrease in a vehicle speed, the rate of changing the speed is set for each of these down-shift modes, and a speed change ratio of the continuously variable transmission is brought to a basic speed change ratio that corresponds to the operation conditions according to the rate of changing the speed is set to different values for each of said down-shift modes.

19. A method of controlling a continuously variable transmission according to claim 18, wherein the rate of changing the speed is larger during the second down-shift mode than during the first down-shift mode.

20. A method of controlling a continuously variable transmission according to claim 18, wherein the basic speed change ratio is set based on the operation conditions including, at least, the throttle opening degree, and it is discriminated to which down-shift modes, said first down-shift mode or said second down-shift mode the down-shift operation corresponds based upon the comparison of a predetermined value with an amount of change within a predetermined period of time of either the throttle opening degree or the basic speed change ratio.

21. A method of controlling a continuously variable transmission according to claim 18, wherein a target speed change ratio is set to follow said basic speed change ratio at a predetermined rate of changing the speed, said basic speed change ratio is compared with the target speed change ratio to discriminate whether the change of speed is either the up-shift or the down-shift, and it is discriminated whether the down-shift is either in the first down-shift mode or in the second down-shift mode.

22. A method of controlling a continuously variable transmission according to claim 21, wherein a rate of progress in the change of speed is operated based upon said basic speed change ratio and said target speed change ratio, and said rate of changing the speed is returned back to a reference rate when said rate of progress becomes equal to or greater than a predetermined value.

* * * * *